Figure 1:
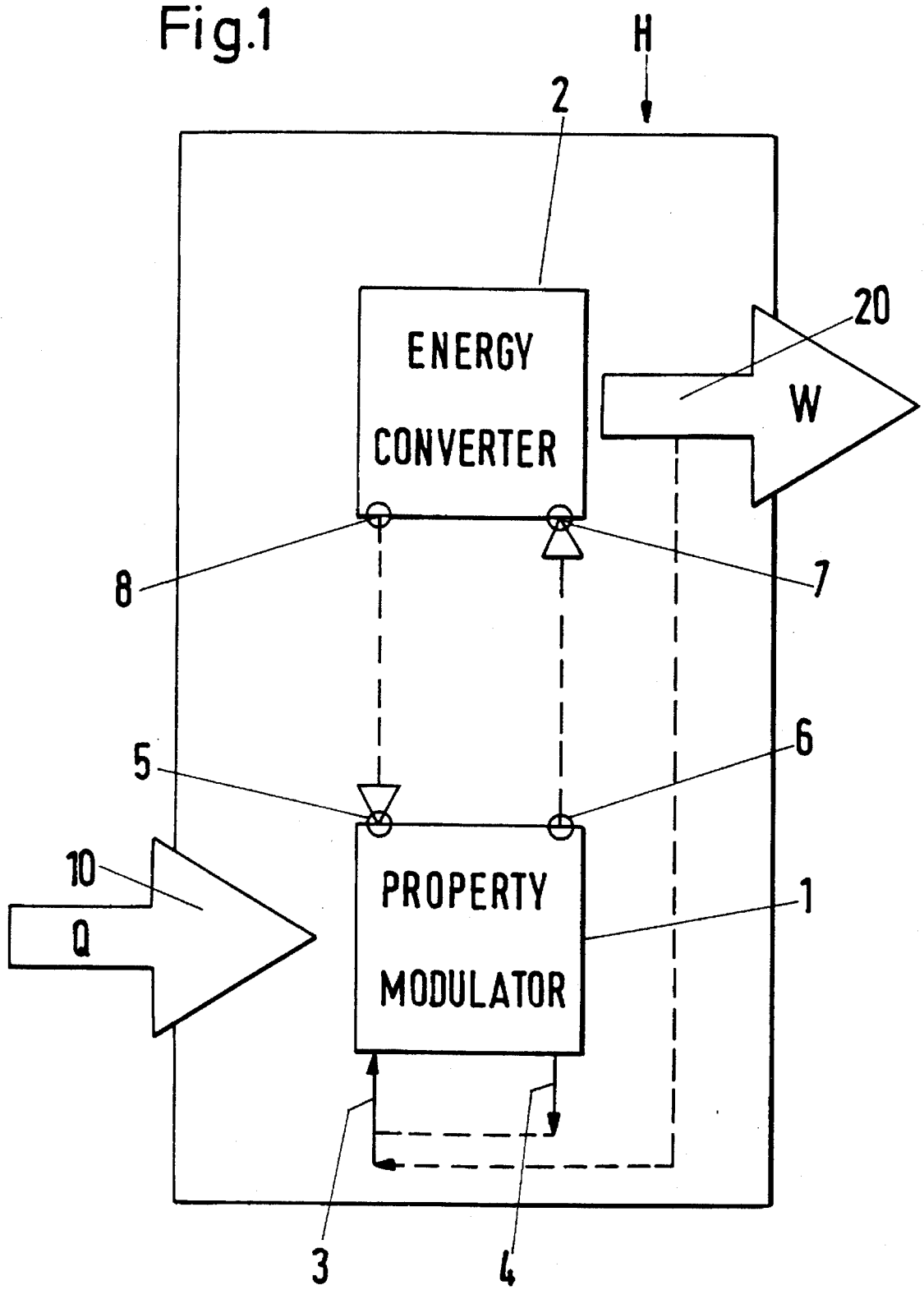

United States Patent [19]

Sidaway

[11] Patent Number: 5,598,704
[45] Date of Patent: Feb. 4, 1997

[54] HEAT ENGINE AND A METHOD OF OPERATING A HEAT ENGINE

[76] Inventor: George Sidaway, 24 rue Baudelaire, F-31520 Ramonville, St. Agne, France

[21] Appl. No.: 166,267

[22] Filed: Dec. 10, 1993

Related U.S. Application Data

[63] Continuation of Ser. No. 827,472, Jan. 29, 1992, abandoned, which is a continuation of Ser. No. 538,537, Jun. 15, 1990, abandoned.

[30] Foreign Application Priority Data

Jun. 16, 1989 [EP] European Pat. Off. ............ 89110997

[51] Int. Cl.⁶ .................................................. F02G 1/04
[52] U.S. Cl. .................................... 60/516; 60/721
[58] Field of Search ........................ 60/516, 655, 645, 60/721

[56] References Cited

U.S. PATENT DOCUMENTS

| | | | |
|---|---|---|---|
| 1,926,463 | 9/1933 | Stoddard | 60/650 X |
| 3,387,773 | 6/1968 | Beaumont . | |
| 3,635,017 | 1/1972 | Kelly . | |
| 3,751,904 | 8/1973 | Rydberg | 60/525 |
| 3,956,894 | 5/1976 | Tibbs | 60/508 |
| 4,037,413 | 7/1977 | Heller et al. | 60/655 |
| 4,228,659 | 10/1980 | Lowther | 60/39.76 |
| 4,293,384 | 10/1981 | Weber | 60/655 X |
| 4,357,800 | 11/1982 | Hecker | 60/519 |
| 4,429,530 | 2/1984 | Beale | 60/520 |
| 4,489,553 | 12/1984 | Wheatley et al. | 60/516 |
| 4,765,138 | 8/1988 | Corey | 60/517 |

FOREIGN PATENT DOCUMENTS 0178348  4/1986  European Pat. Off. .

OTHER PUBLICATIONS

Engineering Thermodynamics, By Jones & Hawkins Chapter 6, "The Second Law of Thermodynamics" John Wiley & Sons; 1963. New York.

*Primary Examiner*—Stephen F. Husar
*Attorney, Agent, or Firm*—Ostrolenk, Faber, Gerb & Soffen, LLP

[57] ABSTRACT

A heat engine (H) has a heat input means (10) and a work output means (20). A property of a first working substance is cyclically changed in a first subsystem forming a property modulator (1). The property modulator is provided with a work transfer input means (3) and a work transfer output means (4), a heat input means (10), a heat transfer input means (5) and a heat transfer output means (6), the sum of said work transfer input and said work transfer output being equal to zero over a cycle of the heat engine. The property modulator (1) is connected to a second subsystem forming an energy converter (2) wherein said change in the property of the first working substance of the property modulator induces a corresponding change in a property of a second working substance of said energy converter. The energy converter (2) is provided with a heat transfer input means (7) receiving a heat input which is equal in magnitude but opposite in sense to the heat output of said heat transfer output means (6) of the property modulator (1), a heat transfer output means (8) delivering a heat output which is equal in magnitude but opposite in sense to the heat input of the heat transfer input means (5) to the property modulator (1) and means for converting said change in property of said second working substance of the energy converter (2) to work delivered to said work output means (20).

15 Claims, 7 Drawing Sheets

5,598,704

HEAT ENGINE AND A METHOD OF OPERATING A HEAT ENGINE

This is a continuation of application Ser. No. 07/827,472, filed on Jan. 29, 1992, now abandoned which is a continuation of Ser. No. 07/538,537, filed on Jun. 15, 1990, now abandoned by George Sidaway entitled "A HEAT ENGINE AND A METHOD OF OPERATING A HEAT ENGINE."

The invention relates to a heat engine having a heat input means, a work output means and at least one working substance operating in a closed cycle, as well as a method for operating a heat engine.

A heat engine is defined as a cyclically operating system across whose boundaries only heat and work flow. A typical example of a heat engine is a power plant including as working substance water which flows steadily through a boiler, a turbine, a condenser and then via a feed pump back to the boiler, executing thereby a closed cycle. This power plant interfaces with its surroundings via the heat input to the boiler, the work output from the turbine, the heat output from the condenser and the work input to the feed pump. For such a power plant, the first law of thermodynamics is valid, i.e. that the cyclic integral of the differential of the amount of heat added to said water is equal to the cyclic integral of the differential of the amount of work delivered through said work output. Since in such systems a considerable amount of heat is withdrawn from the system via the condenser, the efficiency of such heat engines is low.

The problem to be solved by the present invention is to provide a heat engine as well as a method for operating a heat engine providing a much higher efficiency.

This problem is solved by a heat engine having a heat input from an external heat input means, a first working fluid operating in a closed cycle, and a work output means to the surroundings. The first working fluid is cyclically compressed and expanded in a first subsystem forming a property modulator thereby cyclically changing at least one of its properties, i.e., pressure, temperature and volume. The property modulator is connected to a second system forming an energy converter wherein the change of the at least one property of the first working fluid of the property modulator induces a corresponding change in a property of a working substance of the energy converter. The property modulator is further provided with:

(a) an internal work transfer means acting as a work transfer input means to compress said first working fluid during the first portion of a cycle and as a work transfer output means as the first working fluid expands during the second portion of the cycle, the sum of the mechanical work transfer input and output being to zero over the cycle, neglecting friction losses, (b) the external heat input means, and (c) heat transfer means transferring heat from said property modulator to said energy converter during the first portion of the cycle and from said energy converter to said property modulator during the second portion of the cycle, thereby inducing the change in the property of the working substance of said energy converter, said energy converter including means for converting said change in said property of said working substance of the energy converter to work delivered to said work output means.

For the heat engines of the present invention, the cyclic integral of the differential of the amount of heat added to said at least one working substance through said heat input means divided by the absolute temperature of said at least one working substance is positive, and further, the cyclic integral of the differential of the amount of heat added to said at least one working substance is equal to the cyclic integral of the differential of the amount of work delivered through said work output. The heat engines according to the present invention have a very high efficiency and yet may be of rather simple and rugged construction.

The first and second working substance operating in the closed cycle may either be identical or there may be different working substances.

According to one embodiment of the heat engine, the property modulator comprises means for cyclically compressing and expanding the first working substance of the property modulator.

The property of this second working substance cyclically changed by the property modulator may be the temperature thereof.

This second working substance may be formed by at least one thermocouple, one junction of which being subjected to the cyclically changed temperature of the first working substance of the property modulator, whereas the other junction of the thermocouple is confined in an adiabatic container and the output of the thermocouple forms the work output of the heat engine.

According to a further embodiment of the heat engine, the energy converter comprises a magnetic circuit including a section forming the second working substance having a magnetic induction changing with its temperature. the magnetic circuit is surrounded by a coil, the terminals thereof forming the work output means.

According to another embodiment, the second working substance may be the dielectric of at least one charged capacitor having a dielectric constant changing with termperature. A second charged capacitor having a dielectric constant relative stable with changing temperatures is connected with its first electrode to the first electrode of the first capacitor whereas the second electrodes of the first and second capacitor form the work output means.

It is further possible that the property of the second working substance which is cyclically changed by the property modulator is the pressure thereof. In this case, the second working substance of the energy converter may be piezoelectric material subjected to the cyclically varying pressure of said first working substance of the property modulator. Further, the second working substance of the energy converter may be magnetic material having a magnetic induction changing with pressure.

In accordance with a preferred embodiment, the heat engine comprises two property modulators operated antiparallel so that the property of the first working substance of each property modulator is, at a given instant, changed in the first property modulator in a first sense, and in the second property modulator in the opposite sense, and vice versa. Each property modulator is connected to its respective energy converter.

One rather simple embodiment of the property modulator comprises a piston operating in a cylinder to compress and expand the first working substance.

Figure 2:
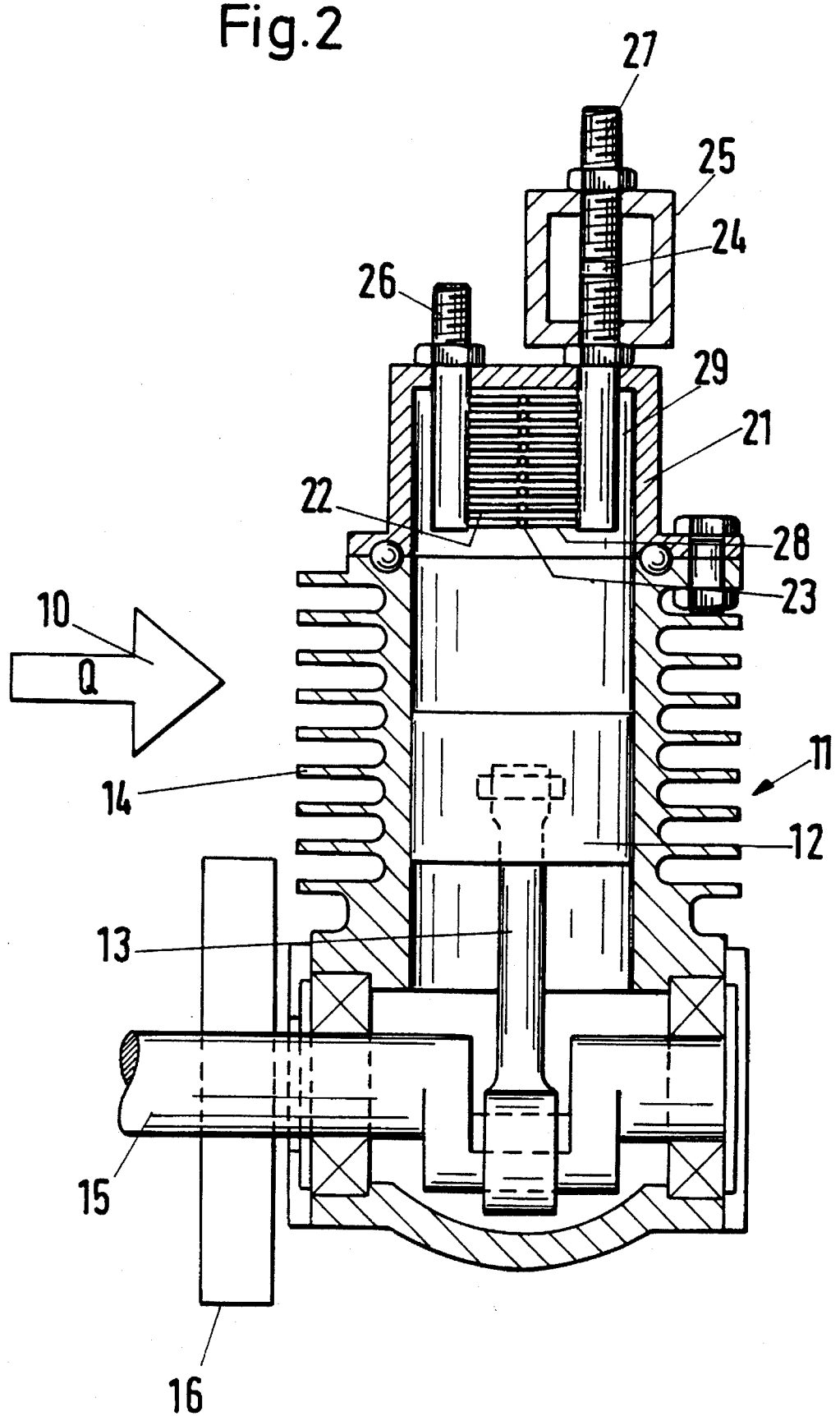
Figure 3:
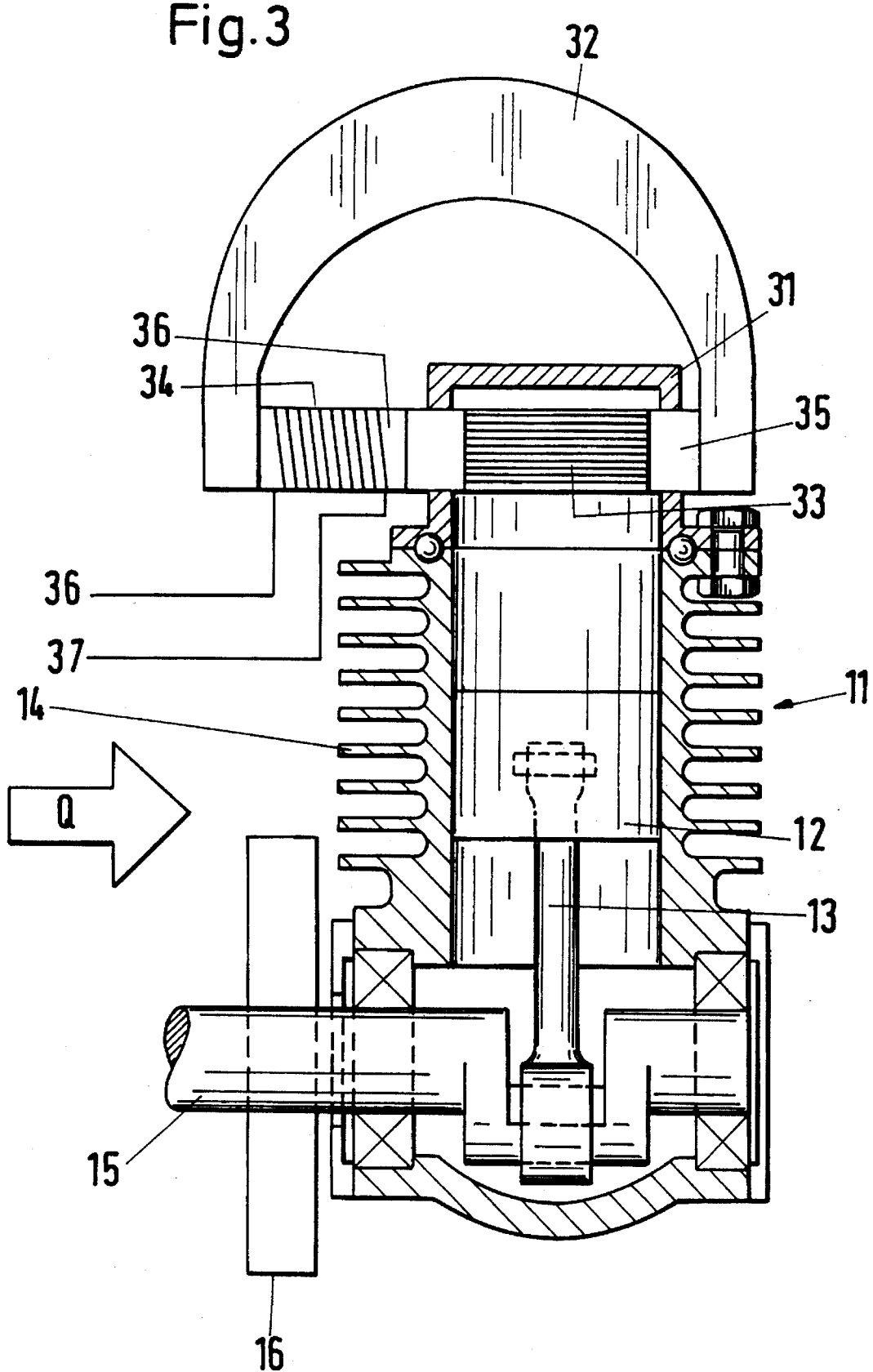
Figure 4:
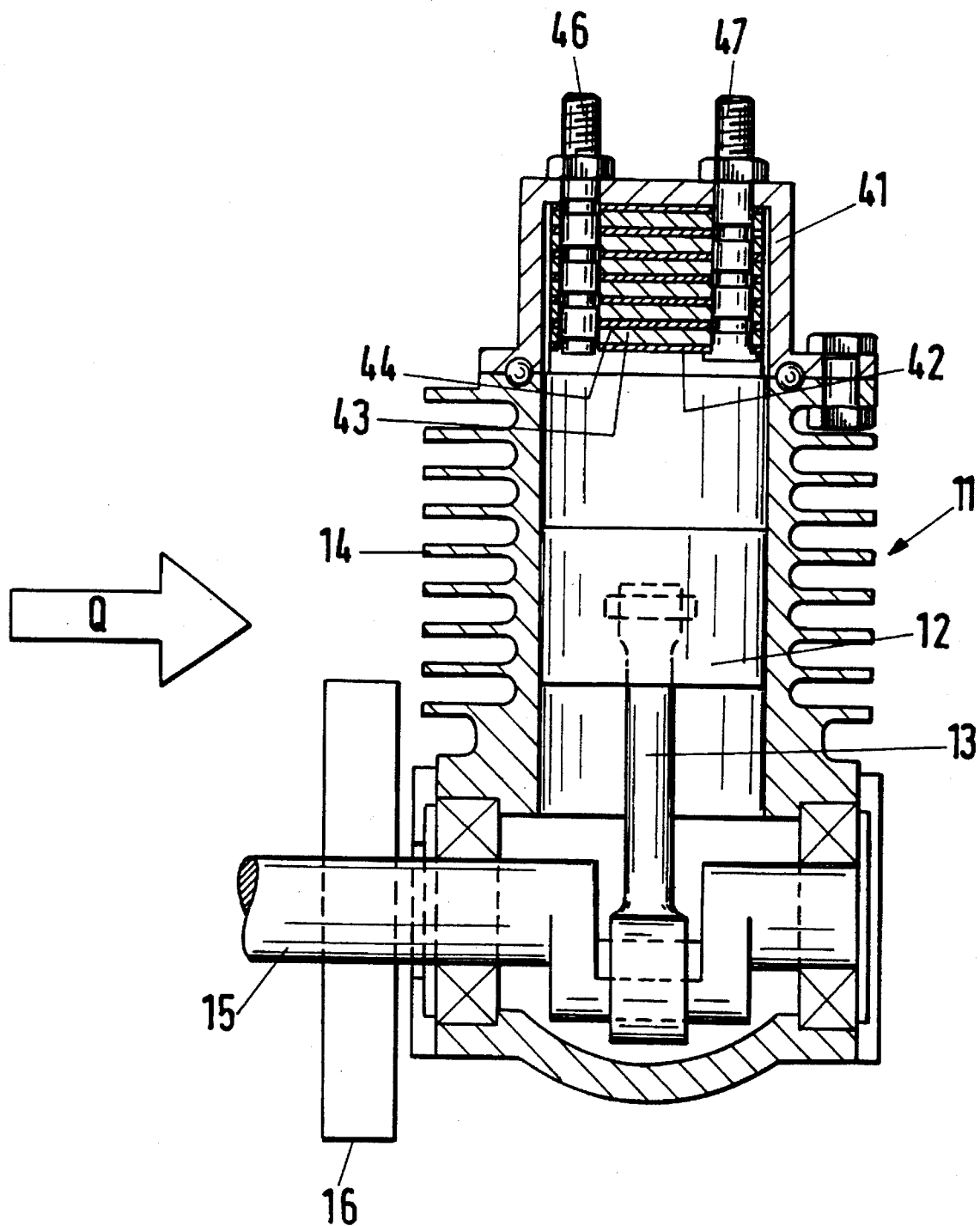
Figure 5:
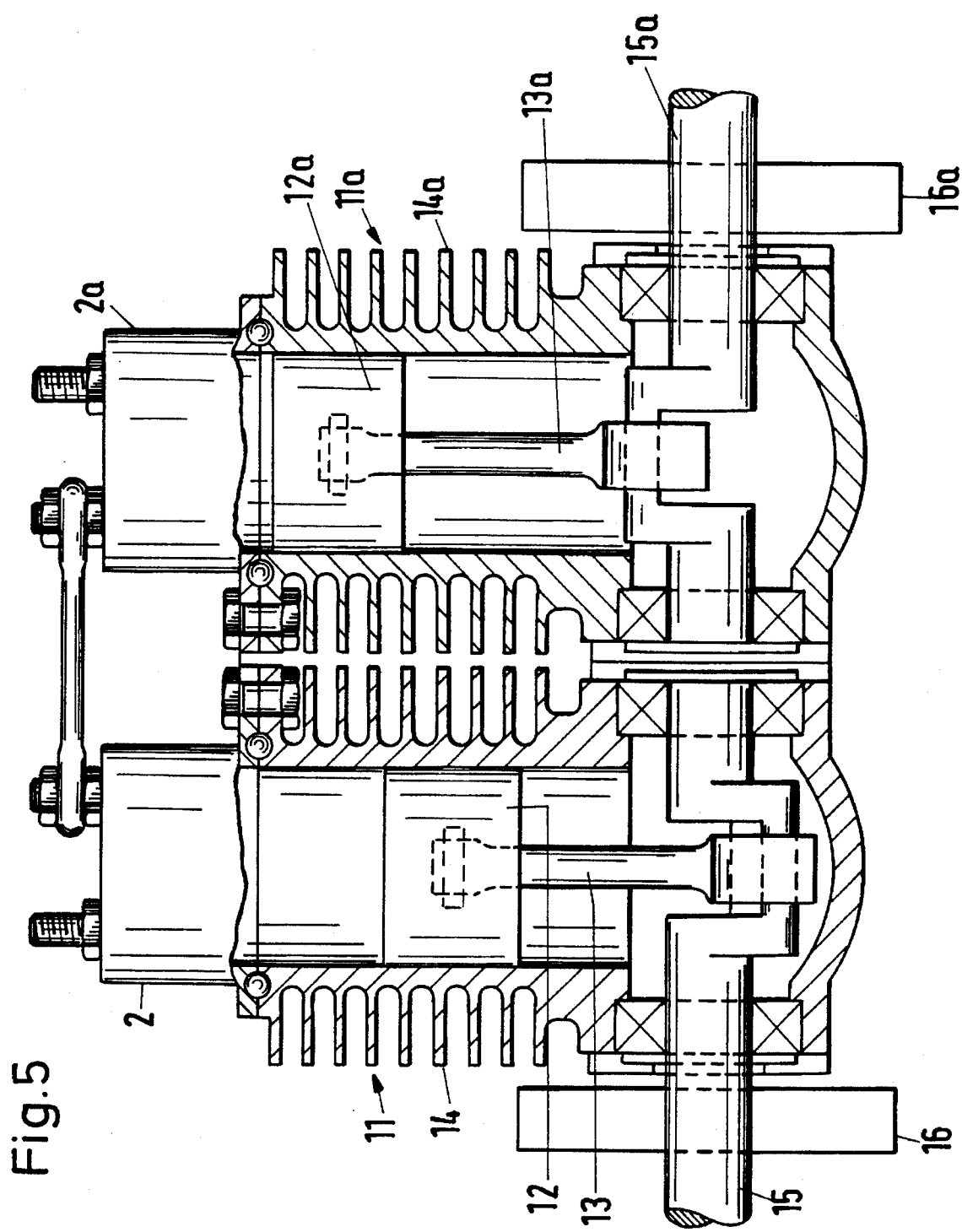
Figure 6:
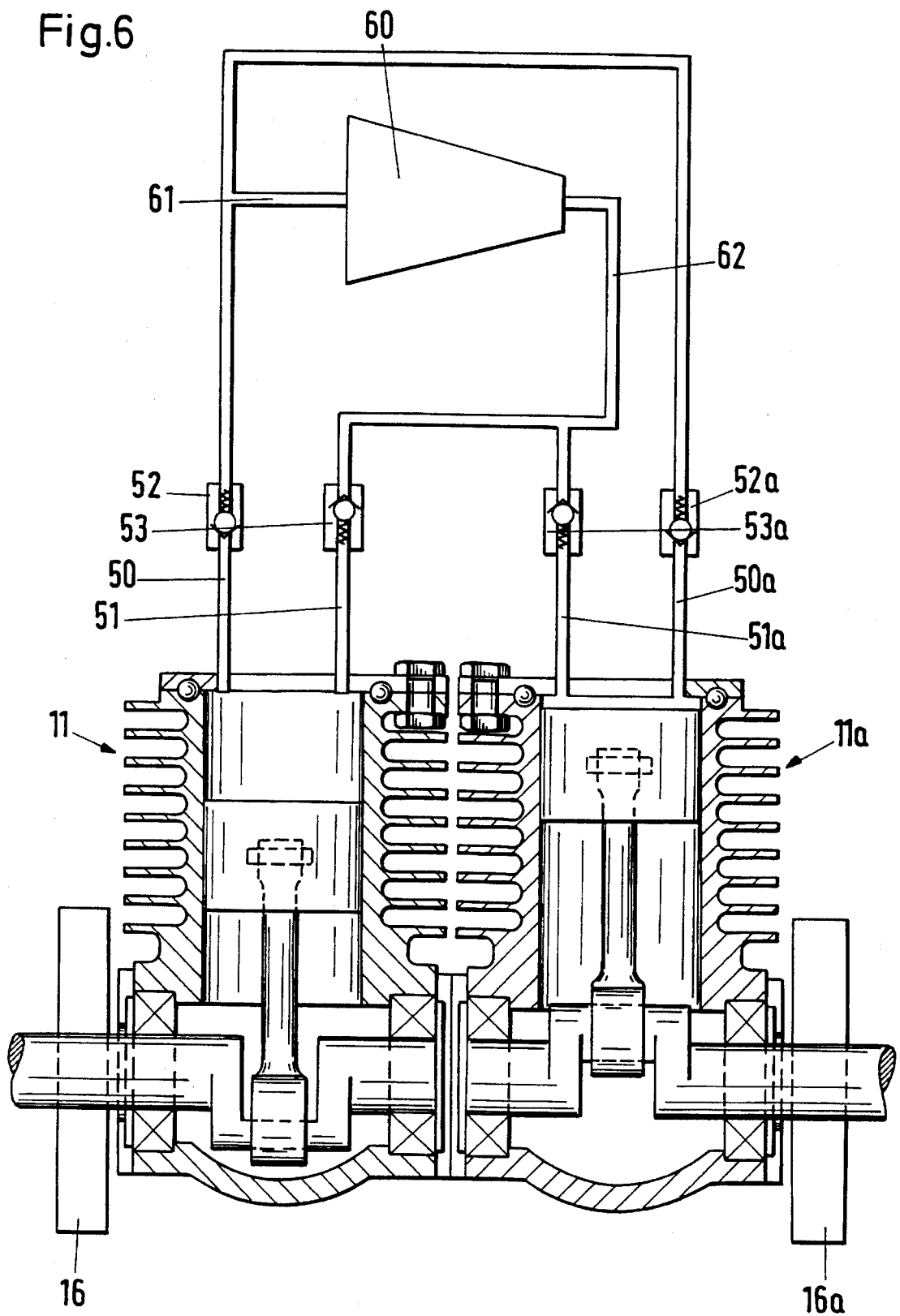
Figure 7:
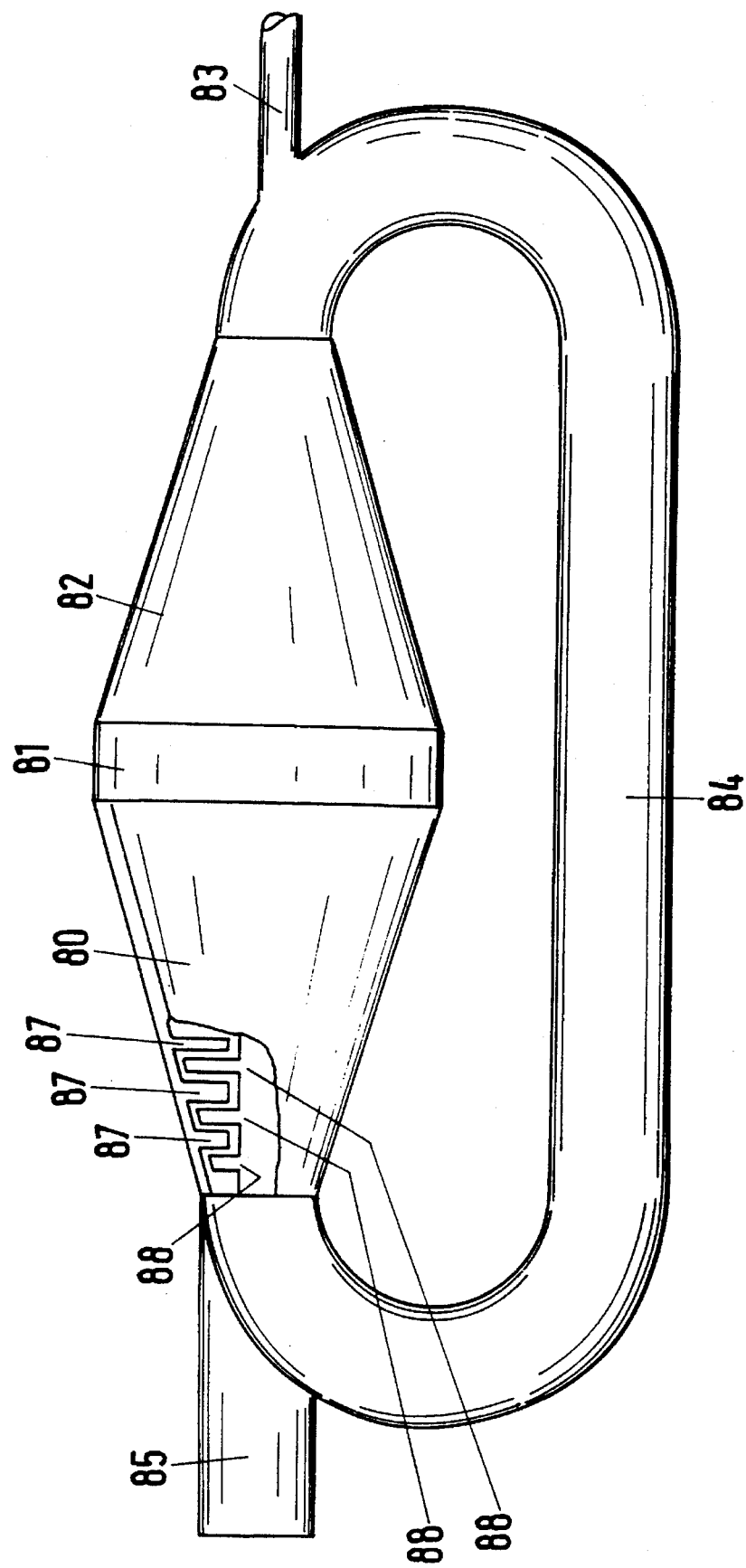

For a better understanding of the present invention, some embodiments without any limitation are set out in the following description refering to the drawings wherein:

FIG. 1 shows a shematic representation of a heat engine according to the present invention, FIG. 2 a practical embodiment of a heat engine according to the present invention using a thermocouple as energy converter, FIG. 3 shows an embodiment of a heat engine of the present invention using magnetic material having a magnetic induction changing with temperature and/or pressure, FIG. 4 shows an embodiment of the heat engine according to the present invention similar to the preceding embodiments but having, in its energy converter section, a plurality of electrodes sandwiched between piezoelectric or dielectric material, FIG. 5 shows an embodiment of the heat engine according to the present invention wherein two property modulators and energy converters are operated anti-parallel, FIG. 6 shows an embodiment of an heat engine according to the present invention comprising two property modulators operated anti-parallel and cooperating, via non-return valves, with a turbine, FIG. 7 shows a further embodiment of the heat engine comprising a turbine, a energy converter, and a compressor as property modulator.

In FIG. 1 there is shown a very basic and diagrammatic view of an embodiment of the heat engine according to the present invention. This heat engine designated generally with H comprises a property modulator and an energy converter discussed in detail below. The property modulator 1 has a work transfer input means 3 and a work transfer output means 4. The property modulator further has a heat transfer output means 6 as well as a heat transfer input means 5. Heat Q is continuously applied over the cycle from an external heat source via a heat input means 10 to the property modulator.

The energy converter 2 is provided with a heat transfer input means 7 connected to the heat transfer output means 6 of the property modulator, and a heat transfer output means 8 connected to the heat transfer input means 5 of the property modulator 1. Further, the energy converter is provided with a work output 20 delivering work W outside the heat engine H.

The property modulator 1 comprises a first working substance whereas the energy converter 2 comprises a second working substance. In certain heat engines, the first and second working fluid may be identical.

Since in the property modulator 1, a property of the first working substance is only cyclically changed, the sum of the work tranfer input and the work transfer output at the means 3, 4 is equal to zero over a cycle.

The property modulator may comprise means for cyclically compressing and expanding the first working substance, thereby cyclically changing the pressure and/or the temperature of the first working substance.

Since the heat transfer output means 6 of the property modulator and its heat transfer input means 5 are coupled to the heat transfer input means 7 and the heat transfer output means 8 of the energy converter 2, respectively, the cyclically changing temperature or pressure of the first working substance of the property modulator 1 is transferred to the second working substance within the energy converter. Part of the heat provided via said heat transfer input means 7 to the energy converter is converted therein into work at the work output 20 whereas the remaining part of the heat is rejected via the heat transfer output means 8 to the property modulator 1.

The amount of heat converted in the energy converter into work at its work output 20 and therefore not transferred to the heat transfer output means 8 of the energy converter is replaced from outside the heat engine via the heat input Q to the property modulator. Therefore, no heat is rejected by the heat engine itself and all heat extracted from the outer heat reservoir connected to the heat input means 10 is converted into work at the output 20 of the energy converter 2. Part of the work at the work output can be provided to the work transfer input 3 of the property modulator 1 to take into account for instance losses in the property modulator due to friction.

In FIG. 2, a first basic embodiment of a heat engine according to the present invention is shown. In this embodiment, the property modulator is formed by a piston-cylinder assembly generally designated with the reference numeral 11. This assembly comprises a piston 12 mounted via a piston rod 13 to a crank shaft 15 forming the work transfer input means and the work transfer output means of the property modulator. The crank shaft 15 is provided with a flywheel 16. Rotation of the crank shaft 15 reciprocates the piston 12 within a cylinder 14 which is provided at its outer circumferance with ribs to improve the transfer of heat from the heat source Q. The energy converter is disposed in a cylinder head 21 and is formed in the embodiment of FIG. 2 by a plurality of thermocouples having a first junction 23 and a second junction 24. The first junctions 23 are exposed to a working substance which, in this embodiment comprises the first and second working substance of the property modulator 1 and the energy converter 2, respectively of FIG. 1. A second junction 24 is confined in an adiabatic container 25. One end of the thermocouple is connected via terminal means 26 and a first section 22 of the thermocouple to the junctions 23 whereas a second section 28 of the thermocouples is connected via a terminal 29 to the second junction 24 which is connected to a third terminal 27. The terminals 26 and 27 form the work output of the energy converter and may for instance be coupled to a transformer and a rectifier unit. On the compression stroke of the piston 12, the working substance within the cylinder is compressed increasing its temperature. This increase of temperature is converted in the first junction 23 of the thermocouples into an electrical voltage since the other junction 24 thereof is kept at a constant temperature. Part of the heat added to the working substance in the compression stroke therefore is converted into electrical energy.

On the expansion or de-compression stroke of the piston 12, the working substance expands and its temperature decreases. At the same time, heat Q is added from the outside via the ribs of the cylinder so that at the end of the expansion stroke, the working substance has the same temperature as at the beginning of the first compression stroke. Also on the expansion stroke, the temperature of the junctions 23 of the thermocouples is changed, this time in reverse sense so that again, at the terminals 26 and 27 a voltage of opposite sense to the sense during the compression stroke is developed.

Since the property modulator formed by the piston-cylinder arrangement only acts to cyclically compress and expand the first working substance, no net work has to be delivered to the crank shaft 15 thereof, neglecting for the time being any frictional losses. Therefore, heat added from the outside heat source Q is converted into electrical work at the terminals 26, 27.

In the above described embodiment of FIG. 2, the energy converter uses thermocouples for converting the cyclically changing temperature of the working substance into electrical energy.

According to a further embodiment not shown, alternative electrodes of a capacitor separated by a dielectric material could be connected to the terminals 26 and 29. The dielectric material forming the second working substance in this case would be a material having a dielectric constant changing with temperature. A second capacitor outside of the piston-cylinder assembly would be connected with one of its electrodes to a first of the alternating groups of electrodes of the capacitor forming part of the energy converter. The second electrode of the second capacitor as well as the second set of electrodes of the first capacitor than would form the work output of the energy converter. If the capacitance of the first capacitor is cyclically changed by the change of the dielectric constant resulting from the cyclically changing temperature of the first working substance, and if both capacitor are initially charged, an alternating voltage is developed across this work output similar to the embodiment using a thermocouple as second working substance.

In FIG. 3, a further embodiment of a heat engine is shown which uses the same property modulator as shown in FIG. 2. Similar parts of this property modulator are designated with identical reference numerals so that no further description thereof is deemed to be necessary. The energy converter comprises a cylinder head including magnetic material 33 forming the second working substance and having a magnetic induction changing with temperature and/or pressure. This magnetic material is part of a magnetic circuit comprising an electromagnet or preferably a permanent magnet 32 of U-shape having its free ends connected via yokes to the magnetic material within the cylinder head 31. One of the yokes, the yoke 33 is elongated and is surrounded by a coil 34 having terminals 36 and 37 forming the work output of the energy converter. The cyclically changing temperature and/or pressure of the first working fluid in the energy converter results in a corresponding cyclic change of the magnetic induction of the magnetic material 33 which then results in an cyclically changing voltage at the terminals 36, 37 of the coil 34. Also in this case, the heat converted into electrical work is replaced by heat transferred from an outer external heat source Q via the ribbed cylinder 14.

In FIG. 4, a further embodiment of the heat engine is shown, again using the property modulator of the embodiments of FIG. 2 and 3.

The energy converter comprises in this embodiment a cylinder head 41 provided with terminals 46 and 47 secured thereto in an electrically insulated manner. The first terminal 46 is connected to a first set of electrodes 42 whereas the terminal 47 is connected to a second set of electrodes 44. Sandwiched between these sets of electrodes 42, 44 are layers of piezoelectric material 43 which is subjected to the changing pressure of the first working substance in the property modulator 11. In this embodiment, the piezoelectric material may be considered as a second working substance and the first working substance cyclically compressed and expanded transfers part of its heat on compressing the piezoelectric material thereto and this heat is converted into an electrical voltage at a terminal 46, 47.

Again the heat converted to work in the energy converter is replaced by heat from the external heat source Q.

This embodiment of FIG. 4 could simply be modified by replacing the piezoelectric material by a capacitive material having a dieelectric constant changing with temperature as indicated above or with pressure, and in this case, one of the terminals, for instance the terminal 47 would be connected to the first electrode of an external capacitor, the second electrode thereof and the terminal 46 then forming the work output of the energy converter.

In FIG. 5, a further embodiment of a heat engine is shown which, more or less comprises two property modulators 11, 11a of the type shown in FIG. 2 through 4 which are operated anti-parallel. Both property modulators are connected to energy converters 2, 2a which are connected in series with one another. By this means, the energy output of the heat engine may be increased.

In FIG. 6, a further embodiment of the heat engine is shown using two property modulators operated anti-parallel, as in the embodiment of FIG. 5. Each property modulator is provided with output lines 50, 50a and input lines 51, 51a provided with respective non-return valves 52, 52a and 53, 53a respectively. The output lines 50, 50a are connected via said non-return valves 52, 52a to the input line 61 of a turbine 60 having an output line 62 connected via the non-return valves 53, 53a to the input lines 51, 51a of the property modulators 11, 11a.

The first working substance in the property modulators is compressed on the compression stroke of the respective property modulator 11, 11a, flows through the turbine 60 and returns to the respective property modulator 11, 11a which in this moment performs its expansion stroke. Also in this case, heat converted into work within said turbine 60 and not returned to the respective property modulator performing its expansion stroke is replaced by heat from the external heat source Q.

In FIG. 7 a further embodiment of the heat engine is shown. This heat engine comprises a turbine 80 forming the energy converter thereof, the output end of said turbine being connected via a duct 81 directly to a compressor 82 forming the property modulator. The output of the compressor 82 is returned via a duct 84 to the input end of the turbine. The rotor shafts of the compressor 82 and the turbine 80 are coupled with one another and from the work output at a shaft 83.

Heat Q is continuously added to the turbine 80 and the compressor 82 by transferring this heat to the turbine stator blades 87 cooperating with the rotor blades 88 thereof. Though this is not shown in the drawings, also the stator blades of the compressor are provided with heat transfer input means similar to that of the turbine section. In this way, heat is added to the heat engine during the compression and expansion processes of the single working substance cycle.

The stator blades 87 may be in contact with any convenient heat source or may be individually heated via any heat transfer means.

For starting the heat engine, pressurized working substance may be introduced via duct 85 into the inlet of the turbine 80.

I claim:

1. A heat engine having a heat input from an external heat input means, a first working fluid operating in a closed cycle, and a work output means to the surroundings, said first working fluid being cyclically compressed and expanded in a first subsystem forming a property modulator, thereby cyclically changing at least one of its properties, i.e., pressure, temperature and volume, said property modulator being connected to a second subsystem forming an energy converter wherein said change of said at least one property of the first working fluid of the property modulator induces a corresponding change in a property of a working substance of said energy converter, said property modulator further being provided with:

(a) an internal work transfer means acting as a work transfer input means to compress said first working fluid during the first portion of a cycle and as a work transfer output means as the first working fluid expands during the second portion of the cycle, the sum of the mechanical work transfer input and output being to zero over the cycle, neglecting friction losses;

(b) the external heat input means; and (c) heat transfer means transferring heat from said property modulator to said energy converter during the first portion of the cycle and from said energy converter to said property modulator during the second portion of the cycle, thereby inducing the change in the property of the working substance of said energy converter to said property modulator during the second portion of the cycle, thereby inducing the change in the property of the working substance of said energy converter, said energy converter including means for converting said change in property of said working substance of the energy converter to work delivered to said work output means.

2. A heat engine according to claim 1, wherein said cyclically changed property of the working substance of the energy converter is the temperature thereof.

3. A heat engine according to claim 2, wherein said energy converter comprises a magnetic circuit including a section forming said working substance, said working substance having a magnetic induction changing with temperature, said magnetic circuit being surrounded by a coil, the terminals of said coil forming the work output means.

4. A heat engine according to claim 2, wherein said working substance is the dielectric of at least one charged capacitor, said working substance having a dielectric constant changing with temperature, and wherein a second charged capacitor having a dielectric constant relatively stable with changing temperatures is provided, a first electrode of the first and second capacitors being connected to one another, whereas the second electrodes of the first and second capacitors forming the work output means.

5. A heat engine according to claim 1, wherein said cyclically changed property of the working substance of the energy converter is the pressure thereof.

6. A heat engine according to claim 5, wherein said working substance of said energy converter is a piezoelectric material subjected to the cyclically varying pressure of said working fluid of said property modulator.

7. A heat engine according to claim 5, wherein the working substance of said energy converter is magnetic material having a magnetic induction changing with pressure, said working substance of the energy converter being subjected to the cyclically changing pressure of said working fluid.

8. A heat engine according to claim 1, wherein said heat engine comprises two property modulators operated antiparallel, a property of the working fluid of each said property modulators is, at a given instant, changed in the first property modulator in a first sense and, in the second property modulator, in the opposite sense, whereas at a second instant, the property of said working fluid of each property modulator is changed in the opposite sense to the first instant, and in that each property modulator is connected to its respective energy converter.

9. A heat engine according to claim 8, wherein each property modulator includes a piston operating in a cylinder to compress and expand said first working fluid.

10. A heat engine according to claim 1, wherein said property modulator comprises a compressor, the energy converter comprises a turbine, the exhaust thereof being connected to the inlet of the compressor, and the outlet of the compressor being connected to the inlet of said turbine, the stator blades of both the turbine and the compressor being provided with heat from an external heat source.

11. A heat engine according to claim 2, wherein said property modulator comprises a compressor, the energy converter comprises a turbine, the exhaust thereof being connected to the inlet of the compressor, and the outlet of the compressor being connected to the inlet of said turbine, the stator blades of both the turbine and the compressor being provided with heat from an external heat source.

12. A heat engine having a heat input from an external heat input means, a first working fluid operating in a closed cycle, and a work output means to the surroundings, said first working fluid being cyclically compressed and expanded in a first subsystem forming a property modulator, thereby cyclically changing at least the temperature of said first working fluid, said property modulator being connected to a second subsystem forming an energy converter wherein said change of said temperature of the first working fluid of the property modulator induces a corresponding change in a property of a working substance of said energy converter, said property modulator further being provided with:

(a) an internal work transfer means acting as a work transfer input means to compress said first working fluid during the first portion of a cycle and as a work transfer output means as the first working fluid expands during the second portion of the cycle, the sum of the mechanical work transfer input and output being equal to zero over the cycle, neglecting friction losses;

(b) the external heat input means; and (c) heat transfer means transferring heat from said property modulator to said energy converter during the first portion of the cycle and from said energy converter to said property modulator during the second portion of the cycle, thereby inducing the change in the property of the working substance of said energy converter to said property modulator during the second portion of the cycle, thereby inducing the change in the property of the working substance of said energy converter, said energy converter including means for converting said change in property of said working substance of the energy converter to work delivered to said work output means, the working substance being formed by at least one thermocouple, one junction of which is subjected to the cyclically changing temperature of the first working fluid of said property modulator, the other junction of said thermocouple being confined in an adiabatic container, the output of said thermocouple forming said work output of the heat engine.

13. A heat engine according to claim 12, wherein the property modulator includes a piston operating in a cylinder to compress and expand said first working fluid.

14. A heat engine according to claim 12, wherein said heat engine comprises two property modulators operated antiparallel, the temperature of the working fluid of each said property modulators being, at a given instant, changed in the first property modulator in a first sense and, in the second property modulator, in the opposite sense, whereas at a second instant, the temperature of said working fluid of each property modulator is changed in the opposite sense to the first instant, and in that each property modulator is connected to its respective energy converter.

15. A heat engine according to claim 14, wherein each property modulator includes a piston operating in a cylinder to compress and expand said first working fluid.

\* \* \* \* \*